(12) United States Patent
Meuer et al.

(10) Patent No.: US 9,000,121 B2
(45) Date of Patent: Apr. 7, 2015

(54) PROCESS FOR PREPARING CONDENSATION RESINS AND THE USE THEREOF

(75) Inventors: Stefan Meuer, Worms (DE); Klaus Menzel, Ludwigshafen (DE); Guenter Scherr, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 312 days.

(21) Appl. No.: 13/383,959

(22) PCT Filed: Jul. 13, 2010

(86) PCT No.: PCT/EP2010/060044
§ 371 (c)(1),
(2), (4) Date: Jan. 13, 2012

(87) PCT Pub. No.: WO2011/009765
PCT Pub. Date: Jan. 27, 2011

(65) Prior Publication Data
US 2012/0116047 A1    May 10, 2012

(30) Foreign Application Priority Data

Jul. 21, 2009 (EP) .................................. 09165966
Jul. 29, 2009 (EP) .................................. 09166738
Jul. 1, 2010 (EP) .................................. 10168154

(51) Int. Cl.
| | | |
|---|---|---|
| C08G 12/12 | (2006.01) | |
| C08L 61/24 | (2006.01) | |
| C08G 12/42 | (2006.01) | |
| C09D 161/24 | (2006.01) | |
| C09J 161/24 | (2006.01) | |

(52) U.S. Cl.
CPC .................. *C08L 61/24* (2013.01); *C08G 12/12* (2013.01); *C08G 12/422* (2013.01)

(58) Field of Classification Search
CPC ...................................................... C08G 12/12
USPC .......... 528/259, 260, 486, 487, 491, 492, 495
See application file for complete search history.

(56) References Cited

U.S. PATENT DOCUMENTS 2,214,851 A   9/1940   D'Alelio
4,295,847 A   10/1981  Petersen et al.

FOREIGN PATENT DOCUMENTS

| DE | 35 25 438 | 1/1987 |
| EP | 0 002 794 | 7/1979 |
| EP | 0 033 115 | 8/1981 |
| EP | 0 271 776 | 6/1988 |
| WO | 97 08255 | 3/1997 |
| WO | 2007 028752 | 3/2007 |

OTHER PUBLICATIONS

U.S. Appl. No. 13/588,299 claims.*
WO 2007/028752 translation.*
International Search Report Issued Sep. 2, 2010 in PCT/EP10/60044 Filed Jul. 13, 2010.

* cited by examiner

*Primary Examiner* — Duc Truong
(74) *Attorney, Agent, or Firm* — Oblon, McClelland, Maier & Neustadt, L.L.P.

(57) ABSTRACT

The present invention relates to new condensation resins formed from urea, formaldehyde and CH-acidic aldehydes, to processes for preparing them, and to use thereof.

19 Claims, No Drawings

PROCESS FOR PREPARING CONDENSATION RESINS AND THE USE THEREOF

The present invention relates to new condensation resins formed from urea, formaldehyde and CH-acidic aldehydes, to processes for preparing them, and to use thereof.

Condensation products of urea and/or its derivatives with formaldehyde and CH-acidic aldehydes are already known from the patent literature. Condensation resins of this kind are frequently used for the provision of pigment preparations. To stabilize the condensation resins in the applications, the resin is treated with strong bases in the course of its preparation. This, as a precaution against reverse reaction and elimination, in particular of carbon monoxide, for example, is described in EP 2794 A1 or EP 271776 A2.

A drawback of this kind of stabilization is that it inevitably involves using sodium or potassium alkoxides in an anhydrous medium and therefore, as a result of the removal of water, imposes exacting requirements on the technical realization of the process. Furthermore, the treatment with strong bases necessitates subsequent neutralization with acid, and hence not only a further process step, but also an increased salt load, which must be removed from the reaction mixture by washing.

The aftertreatment also raises the shelf life of the products. It is thought that this basic aftertreatment breaks down free aldehyde groups in the condensation product, in the form of a disproportionation, for example, thereby preventing reverse reactions or follow-on reactions of the condensation product. For the aftertreatment of the condensation product, therefore, the compounds which can be used are those which are known to allow reaction of aldehyde groups, and more particularly are strong bases, and especially alkoxides.

It was an object of the present invention to develop condensation products of urea, formaldehyde and CH-acidic aldehydes that can be stabilized more easily.

This object has been achieved by means of a process for preparing condensation resins from at least one, preferably just one, urea, formaldehyde, and at least one, preferably just one, CH-acidic aldehyde, by reacting ureas of the general formula (I) and/or (II)

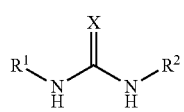
(I)

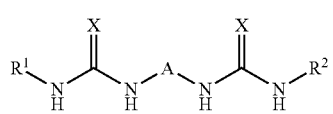
(II)

in which $R^1$ and $R^2$ independently of one another are hydrogen or identical or different $C_1$-$C_{20}$ alkyl radicals, A is a $C_1$-$C_{20}$ alkylene radical and X is oxygen or sulfur, with formaldehyde and with a CH-acidic aldehyde of the general formula (III)

(III)

in which the radicals $R^3$ and $R^4$ independently of one another are identical or different alkyl, cycloalkyl, aryl or alkylaryl radicals, or $R^3$ and $R^4$ may together form a ring, in the temperature range between 60 and 150° C. in the presence of acids or bases, optionally in the presence of solvent and/or diluent, which process comprises carrying out the reaction at least partly in the presence of at least one compound (IV) which has two nucleophilic groups, selected from the group consisting of hydroxyl groups (—OH), primary amino groups (—NH$_2$), secondary amino groups (—NH—) and thiol groups (—SH).

One advantage of the process of the invention is that there is no need for the basic aftertreatment with, for example, alkali alkoxides in an anhydrous medium.

Furthermore, the condensation products obtained by the process of the invention have a lower viscosity than comparable products stabilized with strong bases, a fact which makes the preparations easier to manage (improved rheology).

This allows an increased solids content in pigment preparations, which reduces the need to use solvents, thereby allowing lower organic emissions (VOC).

The condensation resins of the invention generally have a number-average molar weight $M_n$ of 400 to less than 1000 g/mol, preferably of 450 to 950 g/mol, and more preferably of 500 to 900 g/mol, a weight-average molar weight $M_w$ of 700 to 3000, and a polydispersity of 1.4 to 3.0.

The values for the number-average and weight-average molecular weights $M_n$ and $M_w$ were determined by means of gel permeation chromatography measurements on PL-GEL (3-column combination; 1×Mini-Mix C and 2×Mini-Mix E). The eluent used was THF. Calibration took place using polystyrene/hexylbenzene reference materials with polydispersities of <1.1. Where the products are not polymers of styrene, the values reported are therefore to be regarded as polystyrene equivalents. Reference materials used: polystyrene of 3000000 to 580 g/mol, and hexylbenzene 162 g/mol. The method is described in Analytiker Taschenbuch Vol. 4, pages 433 to 442, Berlin 1984.

The condensation resins of the invention generally have an acid number in accordance with DIN EN 2114 of less than 10 mg KOH/g, preferably of less than 8, more preferably of less than 5, very preferably of less than 3, more particularly of less than 2, and in special cases less than 1 mg KOH/g.

The condensation resins of the invention generally have a hydroxyl number in accordance with DIN ISO 4629 of 5 to 60 mg KOH/g, preferably of 10 to 50, more preferably of 15 to 45, and very preferably of 20 to 40 mg KOH/g.

The condensation resins of the invention generally have a saponification number in accordance with DIN 53401 of less than 100 mg KOH/g, preferably of 5 to 90, more preferably of 10 to 70, and very preferably to 20 to 50 mg KOH/g.

The condensation resins of the invention generally have a residual aldehyde (III) monomer, more particularly isobutyraldehyde content of less than 500 ppm by weight, preferably of less than 400 ppm by weight, and more preferably of less than 300 ppm by weight.

The condensation resins of the invention generally have a residual formaldehyde monomer content of less than 500 ppm by weight, preferably of less than 400 ppm by weight, more preferably of less than 300 ppm by weight, very preferably of less than 200, and more particularly of less than 100 ppm by weight.

The condensation resins of the invention generally have a glass transition temperature, $T_g$, by the DSC method (Differential Scanning calorimetry) in accordance with ASTM 3418/82 with a heating rate of 2.5° C./min, of less than 50° C., preferably of less than 40° C., more preferably of less than 30° C., very preferably of less than 20° C., and more particularly of less than 10° C.

The synthesis components of the resins of the invention are now detailed:

Suitable ureas are those of the general formula (I) or (II)

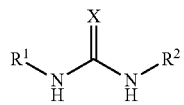

(I)

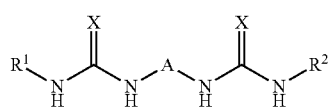

(II)

in which $R^1$ and $R^2$ independently of one another are hydrogen or identical or different $C_1$-$C_{20}$-, preferably $C_1$- to $C_4$-alkyl radicals, A is a $C_1$-$C_{20}$-, preferably $C_1$- to $C_4$-, more preferably $C_1$- to $C_3$- and very preferably $C_1$- to $C_2$-alkylene radical, and X is oxygen or sulfur, preferably oxygen.

As well as urea or thiourea it is also possible to use mono-substituted and disubstituted ureas and also alkylenediureas.

It is preferred to use urea ($H_2N$—(CO)—$NH_2$) for preparing the resins of the invention.

The formaldehyde may be used in the form of an aqueous solution, with a strength, for example, of 30% to 55%, preferably 35% to 49%, more preferably 40% to 49%, in the form of paraformaldehyde or in the form of trioxane, tetroxane or formaldehyde acetals, preferably in aqueous solution.

Since the condensation proceeds via hydroxymethylureas it is possible as well to use the corresponding hydroxymethylureas in lieu of the ureas and the formaldehyde.

These hydroxymethylureas can be generated preferably by preliminary condensation of the formaldehyde with urea in situ; the resulting reaction mixture from the preliminary condensation is preferably used in the process of the invention.

For a preliminary condensation of this kind, urea and formaldehyde are reacted in a molar ratio of 1:1 to 1:15, preferably 1:3 to 1:10, more preferably 1:7 to 1:9, at temperatures of 20° C. to 120° C., preferably 50-120° C. for a duration of 10 minutes to 6 hours. This reaction takes place preferably at pH levels of up to 6, but is also possible in the alkaline range. The water of reaction formed can be left in the reaction mixture, but it can also be removed together with the water, introduced as a result of use of water-containing formaldehyde, with removal taking place for example by distillation or stripping, preferably by azeotropic distillation with an azeotrope former.

The resulting reaction mixture subjected to preliminary condensation is then, in one preferred embodiment, used in the process of the invention, and the formaldehyde and urea employed in the preliminary condensation are taken into account in the context of the reaction stoichiometry.

CH-acidic aldehydes may be those of the general formula (III)

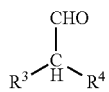

(III)

in which the radicals $R^3$ or $R^4$ independently of one another are identical or different $C_1$-$C_{20}$-, preferably $C_1$- to $C_4$-alkyl, $C_3$-$C_{20}$-, preferably $C_6$- to $C_{12}$-cycloalkyl, $C_6$-$C_{20}$-, preferably $C_6$- to $C_{12}$-aryl, or alkylaryl radicals, or $R^3$ and $R^4$ together may form a ring. CH-acidic aldehydes in accordance with the invention are those which have just one hydrogen atom on the $C_\alpha$, carbon atom adjacent to the carbonyl group.

Examples of $C_1$-$C_{20}$-alkyl radicals are methyl, ethyl, propyl, isopropyl, n-butyl, sec-butyl, tert-butyl, pentyl, hexyl, heptyl, octyl, 2-entylhexyl, 2,4,4-trimethylpentyl, decyl, dodecyl, tetradecyl, hexadecyl, octadecyl, 1,1-dimethylpropyl, 1,1-dimethylbutyl, and 1,1,3,3-tetramethylbutyl.

Examples of $C_3$-$C_{20}$-cycloalkyl radicals are cyclopropyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, and norbornyl.

Examples of $C_6$-$C_{20}$-aryl or alkylaryl radicals are phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert.-butylphenyl, dodecylphenyl, benzyl, 1-phenylethyl, 2-phenylethyl, α,α-dimethylbenzyl, benzhydryl, p-tolylmethyl and 1-(p-butylphenyl)-ethyl.

$C_1$-$C_4$-alkyl for the purposes of this specification is methyl, ethyl, iso-propyl, n-propyl, n-butyl, iso-butyl, sec-butyl and tert-butyl, preferably methyl, ethyl, n-propyl, and n-butyl, more preferably methyl and ethyl, and preferably methyl.

Examples of radicals $R^1$ and $R^2$ are independently of one another hydrogen and $C_1$- to $C_4$-alkyl, preferably hydrogen and methyl, and more preferably hydrogen.

Examples of possible alkylene radicals A are methylene, 1,2-ethylene, 1,2-propylene, 1,3-propylene, 1,4-butylene, 1,6-hexylene, 2-methyl-1,3-propylene, 2-ethyl-1,3-propylene, 2,2-dimethyl-1,3-propylene and 2,2-dimethyl-1,4-butylene.

Preferred radicals A are methylene, 1,2-ethylene, 1,2-propylene and 1,3-propylene, particular preference being given to methylene and 1,2-ethylene, and methylene being particularly preferred.

Preferably the radicals $R^3$ and $R^4$ are independently of one another preferably alkyl or cycloalkyl, more preferably $C_1$- to $C_4$-alkyl, very preferably methyl, ethyl, n-propyl and n-butyl, more particularly methyl, ethyl and n-butyl, and especially methyl.

Where the radicals $R^3$ and $R^4$ form a ring together with the $C_\alpha$ carbon atom adjacent to the carbonyl group, the ring in question is preferably a five- to twelve-membered ring, an example being cyclopentyl, cyclohexyl, cyclooctyl or cyclododecyl, preferably cyclopentyl, cyclohexyl or cyclododecyl, and more preferably cyclopentyl or cyclohexyl.

Examples of CH-acidic aldehydes are preferably CH-acidic aldehydes containing exclusively alkyl and/or cycloalkyl groups, more particularly isobutyraldehyde, 2-ethylhexanal, 2-methylpentanal and isovaleraldehyde, very preferably isobutyraldehyde, 2-ethylhexanal and 2-methylpentanal, and more particularly isobutyraldehyde.

For the process of the invention, urea, formaldehyde, and CH-acidic aldehyde are used generally in a molar ratio from 1:2 to 15:2 to 15, preferably from 1:3 to 12:3 to 12, more preferably from 1:3.8 to 8:3.8 to 9.

Suitable acids are organic and inorganic acids, preferably acids having a $pK_a$ of up to 3. Examples thereof are sulfuric acid, phosphoric acid, nitric acid, hydrochloric acid, phosphorous acid ($H_3PO_3$), diphosphoric acid ($H_4P_2O_7$), sulfonic acids, more preferably methanesulfonic acid, trifluoromethanesulfonic acid, para-toluenesulfonic acid, benzenesulfonic acid, dodecylbenzenesulfonic acid, cyclododecanesulfonic acid, camphorsulfonic acid or acid ion exchangers with sulfonic acid groups, and also formic acid.

It is also possible, albeit less preferable, to catalyze the condensation basically. This can be done using basic alkali metal, alkaline earth metal or quaternary ammonium compounds, preferably alkali metal compounds, more preferably sodium or potassium, very preferably sodium, examples being oxides, hydroxides ($OH^-$), carbonates ($CO_3^{2-}$), amides ($NH_2^-$) or $C_1$- to $C_{20}$-alkoxides, preferably hydroxides or $C_1$- to $C_4$-alkoxides, more preferably hydroxides, methanoxides, ethoxides or tert-butoxides, very preferably hydroxides or methoxides.

The catalyst is used generally in amounts of 0.5 to 30 mol %, based on the CH-acidic aldehyde, preferably in amounts of 2 to 20, more preferably 3 to 10 mol %.

Especially when using basic compounds it is also possible in addition to add phase transfer catalysts.

Preferred phase transfer catalysts are tetrasubstituted ammonium salts, more preferably of the formula

in which
$R^5$ to $R^8$ each independently of one another are $C_1$- to $C_{20}$-alkyl or $C_6$- to $C_{20}$-alkylaryl radicals and
$X^-$ is an anion of an acid.

The radicals $R^5$ to $R^8$ preferably have a total of at least 8, more preferably at least 12, very preferably at least 15 carbon atoms.

Examples of anions $X^-$ are chloride, bromide, iodidd, sulfate, methylsulfate, ethylsulfate, methylcarbonate, trifluoromethanesulfonate, $C_1$-$C_{20}$-alkylsulfonate or $C_6$-$C_{20}$-alkylaryl-sulfonate.

The condensation is generally carried out in the temperature range between 60 and 150, preferably 80 and 100° C.

In carrying out the process of the invention it is possible additionally to use solvents and/or diluents, optionally also as azeotrope formers for the azeotropic removal of water. Particularly suitable solvents for the azeotropic removal of water include aliphatic, cycloaliphatic and aromatic hydrocarbons or mixtures thereof. Preference is given to using n-pentane, n-hexane, n-heptane, cyclohexane, methylcyclohexane, benzene, toluene or xylene. Particular preference is given to cyclohexane, methylcyclohexane, xylene and toluene.

Solvents which have been found particularly useful are aromatic hydrocarbons. Among them, xylene is deserving of particular emphasis.

In the process of the invention, in contrast to the prior art, it is not mandatory to make the reaction mixture water-free. Instead it is enough to separate the water from the reaction mixture down to a level of not more than 5% by weight, preferably not more than 2.5% by weight.

In accordance with the invention the condensation resin is prepared in the presence of at least one, for example 1 to 4, preferably 1 to 3, more preferably 1 to 2, and most preferably just one compound (IV) which has exactly two nucleophilic groups, selected from the group consisting of hydroxyl groups (—OH), primary amino groups (—$NH_2$), secondary amino groups (—NH—) and thiol groups (—SH), preferably selected from the group consisting of hydroxyl groups (—OH), primary amino groups (—$NH_2$) and secondary amino groups (—NH—), more preferably selected from the group consisting of hydroxyl groups (—OH) and primary amino groups (—$NH_2$), and very preferably the nucleophilic groups being hydroxyl groups (—OH).

This compound (IV) may have two identical nucleophilic groups, and hence is a diol, a diamine or a dithiol, or else the compound (IV) may also carry different nucleophilic groups, and so is an amino alcohol, a mercapto alcohol or a mercapto amine.

Preferred compounds (IV) are diols, diamines, amino alcohols and mercapto alcohols; diols, diamines and amino alcohols are particularly preferred; diols and amino alcohols are especially preferred; and diols more particularly preferred.

The diol is preferably an alkanediol or cycloalkanediol, more preferably a 1,2- or 1,3-alkanediol.

The diol is preferably of low molecular weight, i.e. it preferably has a molecular weight below 400 g/mol.

With particular preference the diol is ethylene glycol, 1,2-propanediol, 1,3-propanediol, 3-methylpentane-1,5-diol, 2-ethyl-1,3-hexanediol, diethylene glycol, dipropylene glycol, 2,4-diethyloctane-1,3-diol, 1,1-dimethylethane-1,2-diol, 2-butyl-2-ethyl-1,3-propanediol, 2-ethyl-2-methyl-1,3-propanediol, neopentyl glycol, neopentyl glycol hydroxypivalate, 1,2-, 1,3- or 1,4-butanediol, 1,6-hexanediol, 1,10-decanediol, 2,2-bis(4-hydroxycyclohexyl)propane, 1,1-, 1,2-, 1,3- and 1,4-cyclohexanedimethanol, tetramethylcyclobutanediol, 1,2-, 1,3- or 1,4-cyclohexanediol, cyclooctanediol, norbornanediol, pinanediol, decalinediol, hydroquinone, bisphenol A, bisphenol F, bisphenol B and bisphenol S.

With very particular preference the diol in question is 1,2-propanediol, ethylene glycol, 1,3-propanediol or neopentyl glycol.

Examples of diamines are those compounds which have two primary and/or secondary amino groups, preferably either two primary or two secondary amino groups, and more preferably two primary amino groups.

Preferred diamines are alkanediamines having a linear or branched and optionally substituted alkylene radical containing 2 to 20, preferably 2 to 12, more preferably 2 to 6 carbon atoms, cycloalkanediamines having an optionally substituted cycloalkylene radical containing 3 to 12, preferably 5 to 6, carbon atoms, arylenediamines, having an optionally substituted arylene radical containing 6 to 12, preferably 6, carbon atoms and diazacycloalkanes having 4 to 12, preferably 4 to 8, carbon atoms. Of these, alkanediamines and diazacycloalkanes are preferred; alkanediamines are particularly preferred.

Examples of alkanediamines are 1,2-ethylenediamine, 1,3-propylenediamine, 1,4-butanediamine, 1,5-pentanediamine, 1,6-hexanediamine, 2,2,4-trimethylhexane-1,6-diamine, 2,2,4,4-tetramethylhexane-1,6-diamine, 1,8-octanediamine, 1,10-decanediamine and 1,12-dodecanediamine, preferably 1,2-ethylenediamine, 1,3-propylenediamine, 1,4-butanediamine, 1,5-pentanediamine and 1,6-hexanediamine, more preferably 1,2-ethylenediamine, 1,4-butanediamine and 1,6-hexanediamine, and with very particular preference 1,2-ethylenediamine and 1,6-hexanediamine.

Also conceivable is 2,2'-oxydiethanamine (2-(2'-aminoethoxy)ethylamine), ornithine $C_1$-$C_4$ alkyl esters or lysine $C_1$-$C_4$ alkyl esters.

Examples of cycloalkanediamines are 1,4-, 1,3- or 1,2-diaminocyclohexane or 2,4- or 2,6-diamino-1-methylcyclohexane.

Further diamines containing cycloalkane groups are 4,4'- or 2,4'-di(aminocyclohexyl)methane, 1-amino-3,3,5-trimethyl-5-(aminomethyl)cyclohexane (isophoronediamine), 1,3- or 1,4-bis(aminomethyl)cyclohexane, and also 3 (or 4), 8 (or 9)-bis(aminomethyl)tricyclo[5.2.1.02.6]decane isomer mixtures.

Examples of arylenediamines are 1,2-, 1,3- and 1,4-phenylenediamines, 2,4- and 2,6-tolylenediamine, and the isomer mixtures thereof.

A noteworthy diazacycloalkane is piperazine.

Examples of dithiols include 1,2-ethanedithiol, 1,3-propanedithiol, 2,2-dimethyl-1,3-propanedithiol, 1,4-butanedithiol, 1,5-pentanedithiol and 2,2'-oxydiethanethiol, preferably 1,2-ethanedithiol and 1,3-propanedithiol.

Examples of amino alcohols include alkanolamines, having an alkylene radical which is linear or branched and optionally substituted and contains 2 to 20, preferably 2 to 12, more preferably 2 to 6 carbon atoms, cycloalkanolamines, having an optionally substituted cycloalkylene radical containing 3 to 12, preferably 5 to 6, carbon atoms, and aminophenols, having an optionally substituted arylene radical containing 6 to 12, preferably 6, carbon atoms.

Examples of alkanolamines are 2-aminoethan-1-ol, 2-aminopropan-1-ol, 1-amino-propan-2-ol, 3-aminopropan-1-ol, 4-aminobutan-1-ol, 6-aminohexan-1-ol, N-methyldiethanolamine, N-methyldipropanolamine, 2-amino-1-phenylethanol and 2-amino-2-phenylethanol. Preference is given to 2-aminoethan-1-ol and 2-aminopropan-1-ol.

Additionally conceivable are serine $C_1$-$C_4$ alkyl esters or threonine $C_1$-$C_4$ alkyl esters.

Cycloalkanolamines are, for example, 2-aminocyclopentan-1-ol, 2-aminocyclohexan-1-ol, 2-aminocyclooctan-1-ol and 2-aminocyclododecan-1-ol.

Aminophenols are, for example, 2-aminophenol, 3-aminophenol and 4-aminophenol, and also tyrosine $C_1$-$C_4$ alkyl esters.

Examples of mercapto alcohols include 2-mercaptoethanol, 2-mercaptophenol and 2-hydroxy-1-propanethiol.

Examples of mercaptoamines include 2-aminothiophenol, 4-aminothiophenol, 2-mercaptoethylamine, cystein $C_1$-$C_4$ alkyl esters and homocystein $C_1$-$C_4$ alkyl esters.

The compound (IV) may be present right from the beginning of the reaction, but is preferably added when formaldehyde, urea and CH-acidic aldehyde have already undergone at least partial reaction with one another.

The conversion may be determined, for example, on the basis of the amount of water discharged, or alternatively by monitoring the viscosity of the reaction mixture. The conversion is preferably based on the aldehyde functions that have already reacted. The free aldehyde functions are preferably determined by the method of De Jong (DIN EN ISO 9020), and the unreacted CH-acidic aldehyde is determined by gas chromatography. The conversion determined in this way ought in general to be at least 30%, preferably at least 40%, more preferably at least 50%, very preferably at least 60%, and more particularly at least 70%.

In general the reaction at the point in time at which the compound (IV) is added ought not to have continued further than 99.9%, preferably not more than 99.5%, more preferably not more than 98%, very preferably not more than 95%, and more particularly not more than 90%.

The compound (IV) can be added to the reaction mixture in portions or, preferably, in one addition.

After the addition of the compound (IV) the reaction ought to be continued for at least 1 hour at a temperature of 50 to 150° C., so that the compound (IV) is incorporated substantially into the condensation resin. If desired, the reaction can be continued after the addition at super- or subatmospheric pressure, preferably at subatmospheric pressure.

The amount of the compound (IV), based on the amount of urea used, is 0.3 to 4 equivalents, preferably 0.5 to 3.5 equivalents and more preferably 0.7 to 2.5 equivalents.

In one preferred embodiment the reaction according to the invention is carried out additionally in the presence of at least one, for example one to three, preferably one to two and more preferably just one alcohol (V), preferably an alkanol, more preferably a $C_1$ to $C_{20}$ alkanol, very preferably a $C_1$ to $C_{10}$ alkanol, and especially a $C_2$ to $C_8$ alkanol.

Examples of alcohols, in addition to the alkanols set out below, include, for example, alkylene glycol and polyalkylene glycol monoalkyl ethers having a molar weight of up to 300 g/mol, preferably polyethylene glycol monoalkyl ethers, preferably ethylene glycol monomethyl ether, ethylene glycol monoethyl ether and 1,3-propanediol monomethyl ether.

Examples of alkanols are methanol, ethanol, isopropanol, n-propanol, n-butanol, isobutanol, sec-butanol, tert-butanol, n-pentanol, n-hexanol, n-heptanol, n-octanol, 2-ethylhexanol, n-decanol, n-dodecanol (lauryl alcohol), stearyl alcohol, cetyl alcohol and lauryl alcohol.

Preferred compounds (V) are methanol, ethanol, isopropanol, n-propanol and n-butanol, more preferably methanol, ethanol and n-butanol, very preferably methanol and n-butanol, and more particularly n-butanol.

The compound (V) may be present from the start of the reaction, but preferably it is added when formaldehyde, urea and CH-acidic aldehyde have already undergone at least partial reaction with one another.

The compound (V) may be added to the reaction mixture in portions or preferably in one addition.

In one preferred embodiment the compound (V) is added before the compound (IV).

Following addition of the compound (V), the reaction ought to be continued for at least 1 hour, preferably at least 2 hours, very preferably at least 3 hours, at 50 to 150° C., so that the compound (V) is incorporated substantially into the condensation resin.

If desired, the reaction after addition may be continued under super- or subatmospheric pressure, preferably under superatmospheric pressure.

The amount of the compound (V), based on the amount of urea used, is 0.05 to 4 equivalents, preferably 0.3 to 3 equivalents and more preferably 0.5 to 1.5 equivalents.

When the desired molecular weight or conversion has been reached, the condensation is halted.

Halting an acidic condensation is done by neutralization with a base, sodium or potassium alkoxide for example, and preferably NaOH or KOH, and removing the water and also any distillatively removable lower oligomers or unreacted monomers that may be present, by means of distillation or stripping.

In the same way, a basic condensation is halted by neutralization with acid.

In accordance with the invention it is possible with preference to forego neutralization with acid.

In general it is sufficient to wash out the salt with water and to free the resin, which is in solution in the organic solvent phase, from the solvent by distillation.

The solvent is separated off in general down to a residual level of not more than 5% by weight, preferably not more than 4% by weight, more preferably not more than 3% by weight, very preferably not more than 2% by weight, and more particularly not more than 1% by weight.

The preparation of the resins of the invention is possible batchwise and continuously.

The condensation resins prepared by the process of the invention are especially suitable for producing pigment preparations.

This is done by mixing at least one pigment P and at least one inventive condensation resin K, and also, optionally, at least one diluent V, and also, optionally, at least one additive AD, with one another.

Such mixing may take place, for example, in a stirred vessel, mixer, extruder or, preferably, in a disperser, or kneading apparatus.

Pigments, according to C D Römpp Chemie Lexikon—Version 1.0, Stuttgart/New York: Georg Thieme Verlag 1995, with reference to DIN 55943, are particulate "organic or inorganic, chromatic or achromatic colorants which are virtually insoluble in the application medium".

Virtually insoluble here means a solubility at 25° C. of less than 1 g/1000 g of application medium, preferably below 0.5, more preferably below 0.25, very preferably below 0.1 and more particularly below 0.05 g/1000 g of application medium.

Examples of pigments P comprise any desired systems of absorption pigments and/or effect pigments, preferably absorption pigments. The number and selection of the pigment components are not subject to any restrictions whatsoever. They may be adapted in any desired way to the particular requirements, such as the desired color impression, for example.

By effect pigments are meant all pigments which exhibit a platelet-shaped construction and impart specific decorative color effects to a surface coating. The effect pigments are, for example, all of the effect-imparting pigments which can be employed commonly in vehicle finishing and industrial coating. Examples of effect pigments of this kind are pure metal pigments, such as aluminum, iron or copper pigments, for example; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, for example, or liquid-crystal pigments.

The color-imparting absorption pigments are, for example, customary organic or inorganic absorption pigments which can be used in the paint industry. Examples of organic absorption pigments are azopigments, phthalocyanine pigments, quinacridone pigments, and pyrrolopyrrole pigments. Examples of inorganic absorption pigments are iron oxide pigments and carbon black.

A further pigment to be cited is titanium dioxide.

Examples of pigments P are listed in WO 97/08255, page 8 line 11 to page 11 line 16, which is hereby part of the disclosure content of this text.

Examples of diluents V are aromatic and/or (cyclo)aliphatic hydrocarbons and mixtures thereof, halogenated hydrocarbons, esters, and ethers.

Preference is given to aromatic hydrocarbons, (cyclo)aliphatic hydrocarbons, alkanoic acid alkyl esters, alkoxylated alkanoic acid alkyl esters, and mixtures thereof.

Particular preference is given to singly or multiply alkylated benzenes and naphthalenes, alkanoic acid alkyl esters and alkoxylated alkanoic acid alkyl esters, and mixtures thereof.

Very particular preference is given to xylene and 1-methoxy-2-propyl acetate.

Preferred aromatic hydrocarbon mixtures are those which comprise predominantly aromatic $C_7$- to $C_{14}$-hydrocarbons and may comprise a boiling range of 110 to 300° C., particular preference being given to toluene, o-, m- or p-xylene, trimethylbenzene isomers, tetramethylbenzene isomers, ethylbenzene, cumene, tetrahydronaphthalene and mixtures comprising them.

Examples thereof are the Solvesso® products of ExxonMobil Chemical, especially Solvesso® 100 (CAS No. 64742-95-6, predominantly $C_9$ and $C_{10}$ aromatics, boiling range about 154-178° C.), 150 (boiling range about 182 to 207° C.) and 200 (CAS-No. 64742-94-5), and also the Shellsol® products from Shell. Hydrocarbon mixtures comprising paraffins, cycloparaffins, and aromatics are also available commercially under the names Kristalloel (for example, Kristalloel 30, boiling range about 158-198° C. or Kristalloel 60: CAS No. 64742-82-1), white spirit (for example likewise CAS-No. 64742-82-1) or solvent naphtha (light: boiling range about 155-180° C., heavy: boiling range about 225-300° C.). The aromatics content of such hydrocarbon mixtures is generally more than 90%, preferably more than 95%, more preferably more than 98%, and very preferably more than 99% by weight. It may be useful to use hydrocarbon mixtures having a particularly reduced naphthalene content.

Halogenated hydrocarbons are, for example, chlorobenzene and dichlorobenzene or its isomer mixtures.

Esters are, for example, n-butyl acetate, ethyl acetate, 1-methoxy-2-propyl acetate and 2-methoxyethyl acetate.

Ethers are, for example THF, dioxane and also the monomethyl and dimethyl, monoethyl and diethyl or mono-n-butyl and di-n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin, and isomer mixtures of linear or branched alkanes and/or cycloalkanes.

Additionally preferred are n-butyl acetate, ethyl acetate, 1-methoxy-2-propyl acetate, 2-methoxyethyl acetate, and also mixtures thereof, more particularly with the aromatic hydrocarbon mixtures recited above.

The condensation resins prepared in accordance with the invention are preferably formulated, for the purpose of setting the viscosity, as a 70 to 90% strength solution in xylene or 1-methoxy-2-propyl acetate.

Additives AD are, for example, dispersants, flow control assistants, plasticizers and rheological assistants. Substances of these kinds are known to the skilled worker.

The present invention hence also provides pigment preparations comprising
   at least one pigment P,
   optionally, at least one diluent V,
   at least one condensation resin K of the invention, and
   optionally, at least one additive AD.

Typical compositions for such pigment preparations are
   10-80% by weight P,
   0-40% by weight V,
   10-70% by weight K, and
   0-15% by weight AD,
with the proviso that the sum total is always 100% by weight.

An advantage of the condensation resins of the invention is that, by virtue of their use in the pigment preparations of the invention, it is possible to introduce a greater amount of pigment P (level of pigmentation) and/or to reduce the amount of diluent V required, in each case in comparison to analogous condensation resins having a softening point of 80° C. or more.

Moreover, the color strength of the pigment preparations is raised through the use of the condensation resins of the invention.

The condensation resins of the invention can be used, furthermore, in combination with other physically drying film formers which are commonly used as film-forming binders, such as cellulose derivatives, e.g. nitrocellulose, ethylcellulose, cellulose acetate, cellulose acetobutyrate, chlorinated rubber, copolymers based on vinyl esters, vinyl ethers, vinyl chloride, acrylic esters and/or vinyl aromatics, e.g. vinyl chloride/vinyl isobutyl ether copolymers, or chemically drying binders, such as alkyd resins and drying and semidrying oils, for the preparation of paints and varnishes, the amount of inventive condensation resin in such paints and varnishes being variable within wide limits, but in the majority of cases being not more than 50% by weight of the total binder.

The film-forming binders of the invention are suitable, using conventional application techniques such as spreading, spraying or pouring, for the coating of substrates, such as wood, chipboard, paper and metal, iron sheets, for example.

The condensation resins obtained in accordance with the processes of the invention are stable on storage and have a lower viscosity than comparable condensation resins stabilized with sodium methoxide, and so the need to use volatile organic compounds is lower, and the amount of nonvolatile constituents that can be included in the formulations is higher.

They have very advantageous processing properties. Coatings are obtained that have very good mechanical properties, good gloss, good light stability, and good water resistance. The film-forming binders of the invention can be used very advantageously, for example, in spray-applied matt-finish materials, rapid-abradable primer coating materials, paper coating materials, and corrosion control coating materials.

The parts and percentages given in the examples are by weight.

EXAMPLES

Example 1

60 g (1 mol) of urea were added to 245 g of 49% strength aqueous formaldehyde (4 mol) in a 2 l four-neck flask with bottom drain, condenser, thermometer, stirrer, and dropping funnel. Then 69 g of 50% strength sulfuric acid (0.35 mol) were added slowly dropwise and the flask was heated to 60° C. Over the course of 15 minutes, 288 g (4 mol) of isobutyraldehyde were added dropwise and the batch was then heated at 80° C. for three hours. 430 ml of o-xylene were added dropwise, the batch was stirred for 5 minutes, and then the aqueous phase was separated off at 80° C. The organic phase was dried by means of azeotropic distillation. 300 ml of o-xylene, 7 g (0.04 mol) of p-toluenesulfonic acid and 53 g (0.5 mol) of neopentyl glycol were added. This was followed by distillation at atmospheric pressure under a water separator until water of reaction was no longer produced. The organic phase was neutralized with a little 25% strength aqueous sodium hydroxide solution, after which it was washed with four times 250 ml of water. The product was distilled to completion, at a temperature of up to 145° C., under a pressure of 100 mbar. This gave 360 g of a colorless resin.

Example 2

60 g (1 mol) of urea were added to 490 g of 49% strength aqueous formaldehyde (8 mol) in a 2 l four-neck flask with bottom drain, condenser, thermometer, stirrer, and dropping funnel. 137 g of 50% strength sulfuric acid (0.7 mol) were added slowly dropwise and the flask was heated to 60° C. Over the course of 15 minutes, 577 g (8 mol) of isobutyraldehyde were added dropwise and the batch was then heated at 80° C. for three hours. 430 ml of o-xylene were added dropwise, the batch was stirred for 5 minutes, and then the aqueous phase was separated off at 80° C. The organic phase was dried by means of azeotropic distillation. 300 ml of o-xylene, 15 g (0.08 mol) of p-toluenesulfonic acid and 63 g (1 mol) of ethylene glycol were added. This was followed by distillation at atmospheric pressure under a water separator until water of reaction was no longer produced. The organic phase was neutralized with a little 25% strength aqueous sodium hydroxide solution, after which it was washed with four times 250 ml of water. The product was distilled to completion, at a temperature of up to 145° C., under a pressure of 100 mbar. This gave 710 g of a colorless resin.

Comparative Example 1

In Analogy to Example 1 of EP 2794 A1

In a flask equipped with condenser, thermometer, stirrer, and dropping funnel, 750 parts of 49% strength formaldehyde, 720 parts of isobutyraldehyde and 150 parts of urea were mixed and, over the course of 10 minutes, 150 parts of 50% strength sulfuric acid were added to the mixture. The mixture was heated to 80° C. and condensed at this temperature for 3 hours. Then 800 parts of xylene were added and the mixture was left with stirring at 75° C. for 20 minutes, after which the stirrer was shut off and the aqueous phase was separated off. The xylene phase was freed from the residual water by azeotropic distillation, admixed with 90 parts of 30% strength sodium methoxide solution, and stirred at reflux temperature for 1 hour. After that it was cooled to 70° C., neutralized with 75% strength sulfuric acid, and washed with twice 500 parts of water. After the washing water had been separated off, the solvent was distilled off from the xylene phase at about 100 mbar until the liquid-phase temperature reached 145° C.

Comparative Example 2

Comparative example 1 was repeated, but with the amount of urea halved.

Comparison of the viscosities (measured as 65% strength solutions in 1-methoxy-2-propyl acetate):

|  | Stabilization with | |
| --- | --- | --- |
|  | U:FA:IBA = 1:4:4 | U:FA:IBA = 1:8:8 |
| NaOMe | 1700 mPas (Comparative example 1) | 200 mPas (Comparative example 2) |
| Neopentyl glycol (Example 1) | 265 mPas |  |
| Ethylene glycol (Example 2) |  | 38 mPas |

U: urea,
FA: formaldehyde,
IBA: isobutyraldehyde

Examples 3 to 6

General Operating Procedure

For examples 3 to 6, the synthesis was always commenced as follows: 60 g (1 mol) of urea were added to 490 g of 49% strength aqueous formaldehyde (8 mol) in a 2 l four-neck flask with bottom drain, condenser, thermometer, stirrer, and dropping funnel. 137 g of 50% strength sulfuric acid (0.7 mol) were added slowly dropwise and the flask was heated to 60°

C. Over the course of 15 minutes, 577 g (8 mol) of isobutyraldehyde were added dropwise and the batch was then heated at 80° C. for three hours. 430 ml of o-xylene were added dropwise, the batch was stirred for 5 minutes, and then the aqueous phase was separated off at 80° C. The organic phase was dried by means of azeotropic distillation.

Example 3

The product obtained in accordance with the general operating instructions was admixed with 300 ml of o-xylene, 15.2 g (0.08 mol) of toluenesulfonic acid monohydrate and 104 g of neopentyl glycol (1 mol). This was followed by distillation at atmospheric pressure under a water separator until water of reaction was no longer produced. The organic phase was neutralized with a little 25% strength aqueous sodium hydroxide solution, after which it was washed with four times 400 ml of water. The product was distilled to completion, at a temperature of up to 145° C., under a pressure of 100 mbar. This gave 753 g of a resin.

Example 4

The product obtained in accordance with the general operating instructions was admixed with 300 ml of o-xylene, 15.2 g (0.08 mol) of toluenesulfonic acid monohydrate and 61 g of monethanolamine (1 mol). This was followed by distillation at atmospheric pressure under a water separator until water of reaction was no longer produced. The organic phase was neutralized with a little 25% strength aqueous sodium hydroxide solution, after which it was washed with four times 400 ml of water. The product was distilled to completion, at a temperature of up to 145° C., under a pressure of 100 mbar. This gave 524 g of a resin.

Example 5

The product obtained in accordance with the general operating instructions was admixed with 300 ml of o-xylene, 15.2 g (0.08 mol) of toluenesulfonic acid monohydrate and 60 g of ethylenediamine (1 mol). This was followed by distillation at atmospheric pressure under a water separator until water of reaction was no longer produced. The organic phase was neutralized with a little 25% strength aqueous sodium hydroxide solution, after which it was washed with four times 400 ml of water. The product was distilled to completion, at a temperature of up to 145° C., under a pressure of 100 mbar. This gave 548 g of a resin.

Example 6

The product obtained in accordance with the general operating instructions was admixed with 300 ml of o-xylene, 15.2 g (0.08 mol) of toluenesulfonic acid monohydrate and 78 g of 2-mercaptoethanol (1 mol). This was followed by distillation at atmospheric pressure under a water separator until water of reaction was no longer produced. The organic phase was neutralized with a little 25% strength aqueous sodium hydroxide solution, after which it was washed with four times 400 ml of water. The product was distilled to completion, at a temperature of up to 145° C., under a pressure of 100 mbar. This gave 616 g of a resin.

Comparison of the viscosities (measured as 65% strength solutions in 1-methoxy-2-propyl acetate):

| Example | Stabilization with | Viscosity [mPas] |
|---|---|---|
| 3 | neopentyl glycol | 49 |
| 4 | monoethanolamine | 80 |
| 5 | ethylene diamine | 185 |
| 6 | 2-mercaptoethanol | 76 |

Example 7

60 g (1 mol) of urea were dissolved using 490 g of 49% strength aqueous formaldehyde (8 mol) in a 2 l four-neck flask with bottom drain, condenser, thermometer, stirrer, and dropping funnel. The batch was heated to 60° C. and 137 g of 50% strength sulfuric acid (0.7 mol) were added slowly dropwise over the course of 4 minutes. Thereafter 577 g (8 mol) of isobutyraldehyde were added dropwise over the course of 15 minutes, and the batch was then held at 80° C. for three hours. Then 430 ml of o-xylene were added dropwise, the batch was stirred for 5 minutes, and then the aqueous phase was separated off at 80° C. The organic phase was dried by means of azeotropic distillation. Then 300 ml of o-xylene, 15 g (0.08 mol) of toluenesulfonic acid monohydrate and 104 g (1 mol) of neopentyl glycol were added. This was followed by distillation under reduced pressure (about 450 mbar, 80° C.) under a water separator until water was no longer obtained. The organic phase was neutralized with a little 25% strength aqueous sodium hydroxide solution, after which it was washed with four times 400 ml of water. The product was then distilled to completion, at a temperature of up to 145° C., under a pressure of 100 mbar. This gave 749 g of a colorless resin, which was diluted with 80 g of 1-methoxy-2-propyl acetate (MPA) to a resin fraction of 90.0% and a viscosity of 23500 mPas.

Example 8

60 g (1 mol) of urea were dissolved using 490 g of 49% strength aqueous formaldehyde (8 mol) in a 2 l four-neck flask with bottom drain, condenser, thermometer, stirrer, and dropping funnel. The batch was heated to 60° C. and 70 g of 98% strength sulfuric acid (0.7 mol) were added slowly dropwise over the course of 20 minutes. Thereafter 577 g (8 mol) of isobutyraldehyde were added dropwise over the course of 15 minutes. This was followed by addition of 74 g (1 mol) of n-butanol over the course of 5 minutes, after which the batch was held at 80° C. for three hours. The stirrer was shut off and, following separation of the phases, the aqueous phase was separated off at 80° C. Added to the organic phase were 15 g (0.08 mol) of toluenesulfonic monohydrate and 104 g (1 mol) of neopentyl glycol. Distillation then took place under reduced pressure (about 450 mbar, 80° C.) and under a water separator until water was no longer obtained. The organic phase was neutralized with a little 25% strength aqueous sodium hydroxide solution, 300 ml of o-xylene were added, and the product was subsequently washed with three times 400 ml of water. The product was then distilled to completion, at a temperature of up to 145° C., under a pressure of 100 mbar. This gave 755 g of a colorless resin, which was diluted with 45 g of MPA to a resin fraction of 94.0% and a viscosity of 19300 mPas.

Example 9

120 g (2 mol) of urea were dissolved using 980 g of 49% strength aqueous formaldehyde (16 mol) in a 3 l jacketed reactor with bottom drain, condenser, thermometer, stirrer, and dropping funnel. The batch was heated to 60° C. and 140 g of 98% strength sulfuric acid (1.4 mol) were added slowly dropwise (2.5 ml/minute). The batch was heated to 62° C. Over the course of 30 minutes, 1150 g (16 mol) of isobutyraldehyde were added dropwise, after which the batch was held at 80° C. for one hour. Thereafter, over the course of 5 minutes, 183 g (2 mol) of n-butanol were added and the batch was subsequently held at 80° C. for three hours. The stirrer was shut off and, following separation of the phases, the aqueous phase was separated off at 80° C. Added to the organic phase were 30.5 g (0.16 mol) of toluenesulfonic acid monohydrate and 208 g (2 mol) of neopentyl glycol. Distillation then took place under reduced pressure (about 100 mbar, 80° C.) and under a water separator until water was no longer obtained. The organic phase was neutralized with a little 50% strength aqueous sodium hydroxide solution, 600 ml of o-xylene were added, and the product was then washed with four times 800 ml of water. The product was then distilled to completion at a temperature of up to 145° C. and a pressure of 100 mbar. This gave 1430 g of a colorless resin, which was diluted with 65 g of MPA to a resin fraction of 95.7% and a viscosity of 14500 mPas.

| Resin | Crude resin fraction [% by weight] | Viscosity [mPas] |
| --- | --- | --- |
| Example 7 | 90.0 | 23 500 |
| Example 8 | 94.0 | 19 300 |
| Example 9 | 95.7 | 14 500 |

Application Examples for Reducing the VOC Content

For preparing the pigment formulations, the components were dispersed with one another, in accordance with the weight figures in the table, and the amount of organic components (VOC) in g/l was ascertained.

The formulations compared with one another were adjusted to a comparable viscosity using the stated amount of solvent.

Comparison A: Inorganic Yellow Pigment with Resin from Comparative Example 1

The resin from comparative example 1 was adjusted with MPA to 60% by weight.

| | |
| --- | --- |
| Resin from comparative example 1 (60% strength) | 23.0 parts |
| MPA | 16.9 parts |
| Disperbyk 2150 | 4.1 parts |
| Aerosil 200 | 1.0 part |
| Bayferrox 3920 | 55.0 parts |
| VOC | about 450 |

Example A

Inorganic Yellow Pigment with Inventive Resin

The resin from example 9 was adjusted with MPA to 92% by weight.

| | |
| --- | --- |
| Resin from example 9 (92% strength) | 30.0 parts |
| MPA | 7.5 parts |
| Disperbyk 2155 | 4.5 parts |
| Aerosil 200 | 1.0 part |
| Bayferrox 3920 | 57.0 parts |
| VOC | about 250 |

Comparison B: Organic Blue Pigment with Resin from Comparative Example 1

The resin from comparative example 1 was adjusted with MPA to 60% by weight.

| | |
| --- | --- |
| Resin from comparative example 1 (60% strength) | 34.5 parts |
| MPA | 38.5 parts |
| Disperbyk 2150 | 7.0 parts |
| H'Blau L 7101 F | 20.0 parts |
| VOC | about 520 |

Example B

Organic Blue Pigment with Inventive Resin

The resin from example 9 was adjusted with MPA to 92% by weight.

| | |
| --- | --- |
| Resin from example 9 (92% strength) | 53.2 parts |
| MPA | 19.8 parts |
| Disperbyk 2155 | 7.0 parts |
| H'Blau L 7101 F | 20.0 parts |
| VOC | about 250 |

Ingredients:

MPA: 1-Methoxy-2-propyl acetate (organic solvent used as diluent)

Disperbyk® 2155: Block copolymer with basic pigment-affinity groups, as wetting and dispersing additive, from Byk Aerosil® 200: Fumed silica from Evonik, as thixotropic agent, for reducing the settling of pigments Bayferrox® 3920: Yellow iron oxide from Lanxess, as inorganic pigment Heliogenblau® L 7101F: Phthalocyanine blue as organic pigment

The invention claimed is:

1. A process for preparing a condensation resin, the process comprising:

reacting (a) at least one selected from the group consisting of a urea of formula (I) and a urea of formula (II):

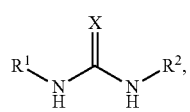

(I)

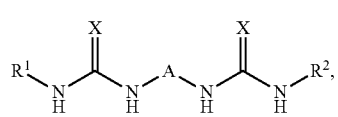

(II)

wherein $R^1$ and $R^2$ are each independently a hydrogen atom or a $C_1$-$C_{20}$ alkyl radical, A is a $C_1$-$C_{20}$ alkylene radical, and X is oxygen or sulfur, (b) formaldehyde, and
(c) at least one CH-acidic aldehyde of formula (III):

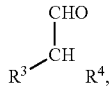

(III)

wherein $R^3$ and $R^4$ are each independently an alkyl, a cycloalkyl, a aryl, or a alkylaryl radical, or $R^3$ and $R^4$ together form a ring, wherein a molar ratio of the urea to the formaldehyde to the CH-acidic aldehyde is from 1:2 to 15:2 to 15, wherein the reacting is carried out at a temperature in a range between 60 and 150° C., in the presence of an acid or a base, at least partly in the presence of at least one compound (IV) selected from the group consisting of a diol, a diamine, an aminoalcohol, and a mercaptoalcohol, the compound (IV) comprising two nucleophilic groups selected from the group consisting of a hydroxyl group (—OH), a primary amino group (—NH$_2$), a secondary amino group (—NH—), and a thiol group (—SH), and optionally in the presence of at least one selected from the group consisting of a solvent and a diluent, and wherein the condensation resin has a glass transition temperature, $T_g$, by the DSC-method in accordance with ASTM 3418/82 with a heating rate of 2.5° C./min, of less than 50° C.

2. The process of claim 1, wherein the compound (IV) is a diol.

3. The process of claim 2, wherein the diol is an alkanediol or a cycloalkanediol.

4. The process of claim 2, wherein the diol is selected from the group consisting of 1,2-propane diol, ethylene glycol, 1,3-propane diol, and neopentyl glycol.

5. The process of claim 1, wherein the compound (IV) is a diamine.

6. The process of claim 5, wherein the diamine is an alkanediamine or a cycloalkanediamine.

7. The process of claim 5, wherein the diamine is selected from the group consisting of 1,2-ethylenediamine, 1,3-propylenediamine, 1,4-butanediamine, 1,5-pentanediamine, 1,6-hexanediamine, 1,4-diaminocyclohexane, 1,3-diaminocyclohexane, 1,2-diaminocyclohexane, 4,4'-di(aminocyclohexyl)methane, 2,4'-di(aminocyclohexyl)methane, 1-amino-3,3,5-trimethyl-5-(aminomethyl)cyclohexane (isophoronediamine), 1,3-bis(aminomethyl)cyclohexane, 1,4-bis(aminomethyl)cyclohexane, 2,4-diamino-1-methylcyclohexane, 2,6-diamino-1-methylcyclohexane, and 3 (or 4),8 (or 9)-bis(aminomethyl)tricyclo[5.2.1.02.6]decane isomer mixtures.

8. The process of claim 1, wherein the compound (IV) is an amino alcohol.

9. The process of claim 8, wherein the amino alcohol is selected from the group consisting of 2-aminoethan-1-ol, 2-aminopropan-1-ol, 1-aminopropan-2-ol, 3-aminopropan-1-ol, 4-aminobutan-1-ol, 6-aminohexan-1-ol, N-methyldiethanolamine, N-methyldipropanolamine, 2-amino-1-phenylethanol, and 2-amino-2-phenylethanol.

10. The process of claim 1, wherein the compound (IV) is added when the conversion of the urea, the formaldehyde, and the CH-acidic aldehyde is at least 30% and not more than 99.9%, based on a total conversion of CH-acidic aldehyde functions.

11. The process of claim 1, wherein the compound (IV) is added and, after the adding, the reacting continues for at least 1 hour at a temperature in a range of 50 to 150° C.

12. The process of claim 1, wherein an amount of the compound (IV) is 0.3 to 4 equivalents, based on a total amount of urea.

13. The process of claim 1, wherein the reacting is carried out in the presence of at least one alcohol (V).

14. The process of claim 13, wherein the alcohol (V) is at least one selected from the group consisting of methanol, ethanol, isopropanol, n-propanol, and n-butanol.

15. The process of claim 1, wherein an amount of the alcohol (V) is 0.05 to 4 equivalents, based on a total amount of urea.

16. The process of claim 1, wherein the urea is $H_2N$—(CO)—$NH_2$.

17. The process of claim 1, wherein the CH-acidic aldehyde is iso-butyraldehyde.

18. The process of claim 1, wherein, the reacting comprises:
(a1) reacting the urea and the formaldehyde at a molar ratio of 1:2 to 1:15 at a temperature in a range of 50-120° C. and for a time in a range of 10 minutes to 6 hours, to obtain a reaction mixture comprising a hydromethylurea; and then
(a2) reacting the hydromethylurea in the reaction mixture with the CH-acidic aldehyde.

19. The process of claim 14, wherein an amount of the alcohol (V) is 0.05 to 4 equivalents, based on a total amount of urea.

* * * * *